Sept. 3, 1935.  H. VERSHBOW ET AL  2,013,118
RACK
Filed Nov. 29, 1933
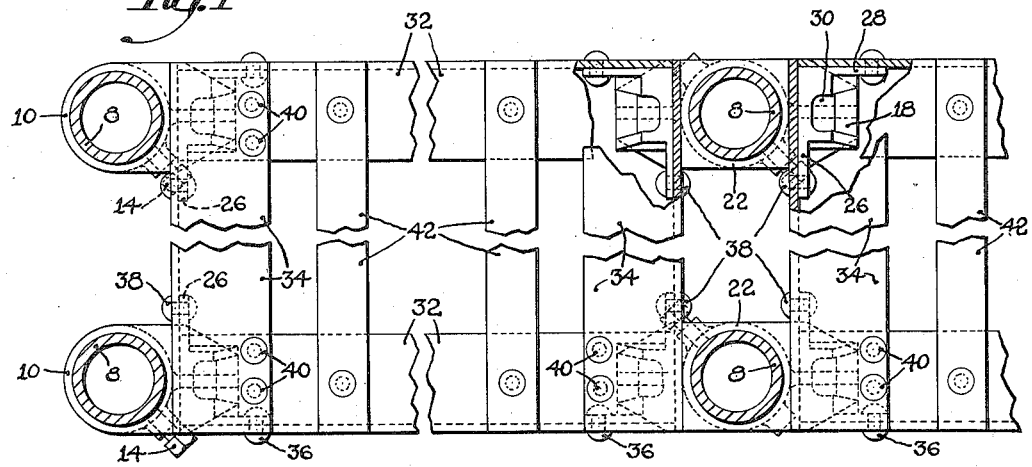
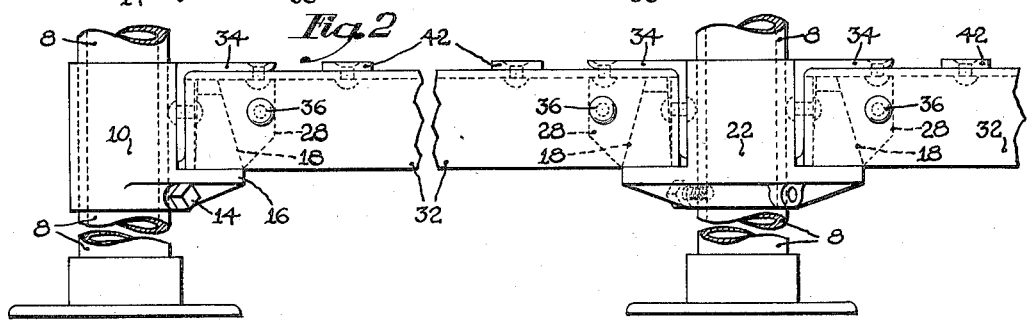
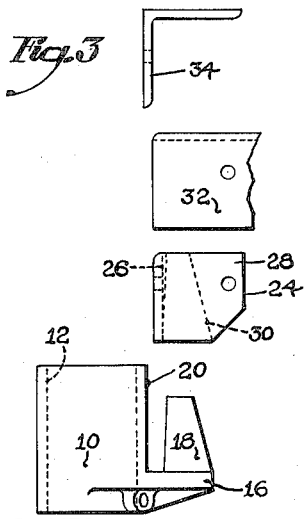
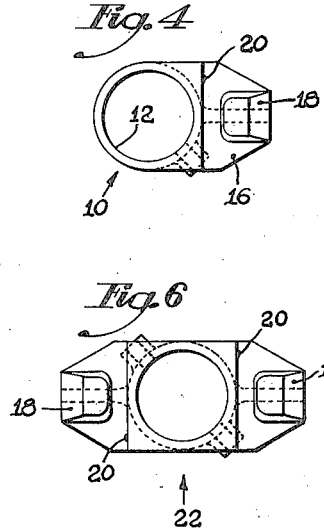
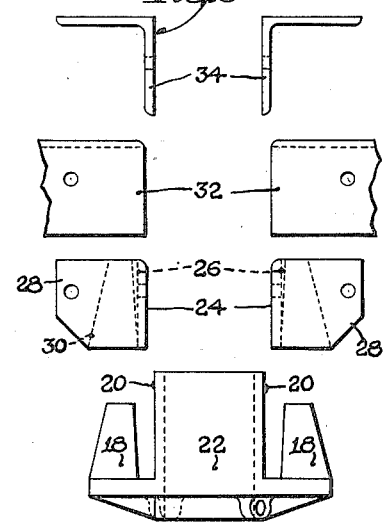
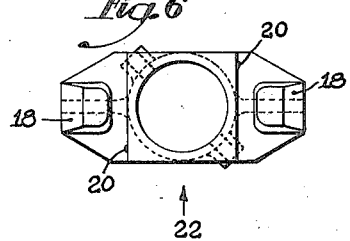

Patented Sept. 3, 1935

2,013,118

UNITED STATES PATENT OFFICE 2,013,118

RACK

Herman Vershbow and Bernard Shivek, Dorchester, Mass.

Application November 29, 1933, Serial No. 700,295

2 Claims. (Cl. 211—147)

The present invention relates to racks, and has for its object to provide a metal rack, particularly for shelving, which is inexpensively constructed and easily assembled, and is of exceptional rigidity. To this end, the present invention comprises the rack hereinafter described and particularly defined in the claims.

In the accompanying drawing, Fig. 1 is a plan view, partly in section, of a rack according to the present invention; Fig. 2 is a front elevation; Fig. 3 is a detail view showing the mode of assembly at a corner; Fig. 4 is a plan view of a corner supporting member; Fig. 5 is a detail view showing the mode of assembly at an intermediate support; and Fig. 6 is a plan view of an intermediate supporting member.

The illustrated embodiment of the invention comprises a set of standards illustrated as lengths of iron pipe 8. To each corner standard is attached a supporting member 10, as illustrated in Fig. 4. Each supporting member 10 has an opening 12 to permit mounting on the pipe 8, attachment to the pipe being afforded by a set screw 14 in a boss at the lower part of the supporting member. The supporting member is formed with a horizontal ledge 16 from which projects an upstanding boss 18. Opposite to the boss, the supporting member is formed with a flat vertical surface 20. The supporting members are preferably malleable castings.

For racks of small size, it is necessary to provide supporting means only at the corners. For longer racks, however, it is desirable to provide intermediate supports illustrated at 22. As shown in Fig. 6, these intermediate supporting members 22 are identical with the corner supporting members 10 except that each has bosses 18 and opposed vertical surfaces 20 at opposite sides.

Co-operating with each boss 18 of the supporting members is a bracket 24 of angle shape having a leg 26 opposed to the vertical faces of the supporting member and another leg 28 at right angles thereto. The leg 26 is formed with a recess 30 to receive the boss 18 of the supporting member.

All of the brackets 24 are of identical shape except for reversal right and left, as clearly indicated in Fig. 1.

The shelving comprises back and front sills 32 and end sills 34, each consisting of an angle iron, as shown in Figs. 3 and 5. The front and back sills are cut to a length to extend perpendicular to opposed vertical faces 20 of the supporting members, the horizontal portion of the sill resting on the tops of the brackets and the side faces against the side legs 28 of the brackets. Each end sill 34 rests at its ends on the tops of the back and front sills 32, and the vertical leg thereof is received in the space between the face 26 of the bracket and the vertical face 20 of the supporting members. The spacing of each boss 18 from the opposed face of the supporting member is such as to accommodate the bracket and the sill by a drive fit.

The front face of the front sill is riveted to the right angle legs 28 of the brackets, as indicated at 36, and the rear face of the rear sill is similarly riveted to its corresponding brackets. The vertical faces of the end sills are riveted to the faces 26 of their corresponding brackets, as indicated at 38. At each corner, the two overlapping sills are secured together by rivets 40. The riveting may be performed prior to or after assembly of the parts.

The assembly is carried out in exactly the same manner at the intermediate supports, as illustrated in Fig. 5.

The rack as thus formed may be used for supporting any desired material. A convenient form of shelving may be made by riveting cross pieces 42 at intervals between the front and back sills. After assembly, a shelf may be easily removed for cleaning or replacement, merely by knocking it free at the corners, and then drawing it forward.

Although a single shelf has been shown in the drawing, it is obvious that any desired number of superposed shelves may be mounted on the standards 8.

Having thus described the invention, what is claimed is:

1. A rack comprising a standard, a supporting member attached to the standard and having a flat vertical face and an upstanding boss adjacent to said face, a bracket having a recess to receive the boss, and also having a flat vertical face opposed to and spaced from the face of the supporting member, and a shelf-supporting sill having a vertical leg received in the space between the opposed faces of the supporting member and bracket.

2. A rack comprising a plurality of standards, a supporting member attached to each standard, each supporting member having a flat vertical face and an upstanding boss adjacent to said face, a bracket for each supporting member comprising an angle piece having a flat face opposed to and spaced from the face of the supporting member and another face at right angles thereto, the angle piece having a recessed portion to receive the boss, and angle sills meeting and overlapping at the bracket, one of said sills having a leg received in the space between the faces of the bracket and the supporting member, the sills being secured to the bracket and to each other.

HERMAN VERSHBOW.
BERNARD SHIVEK.